July 6, 1926.  1,591,578
E. G. THOMAS ET AL
WEIGHING SCALE
Filed May 31, 1924    5 Sheets-Sheet 2
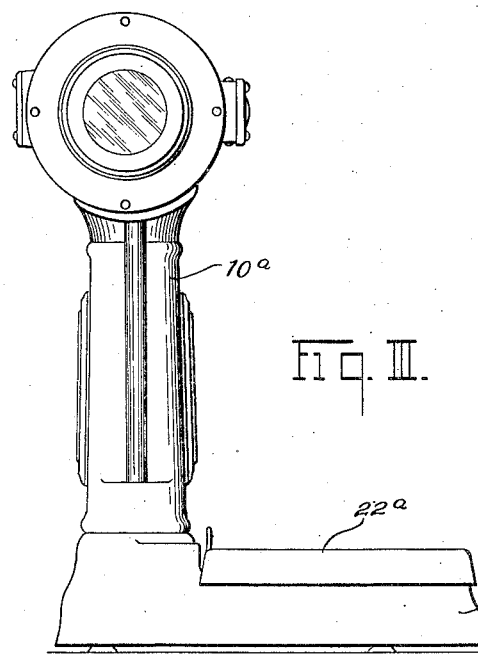
Fig. III.
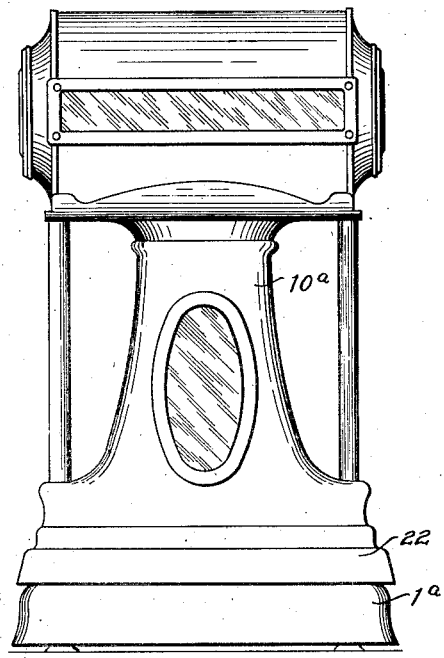
Fig. IV.
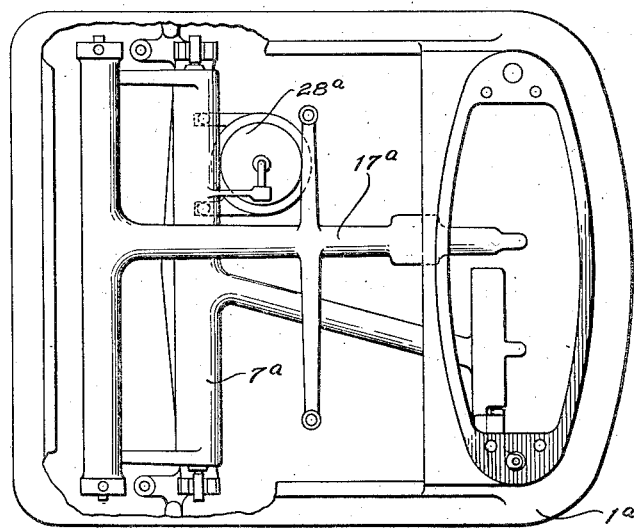
Fig. V.
Inventors
EDWARD G. THOMAS
CHARLES O. MARSHALL
By
Attorney

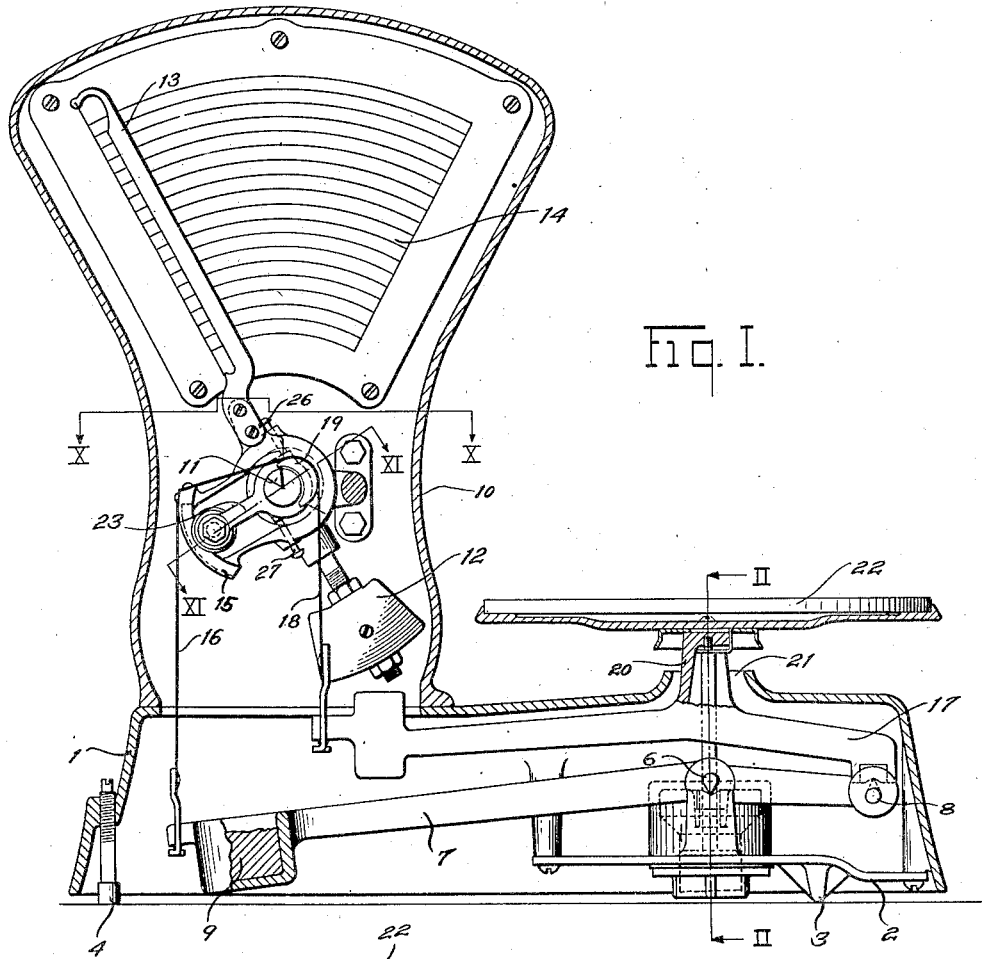

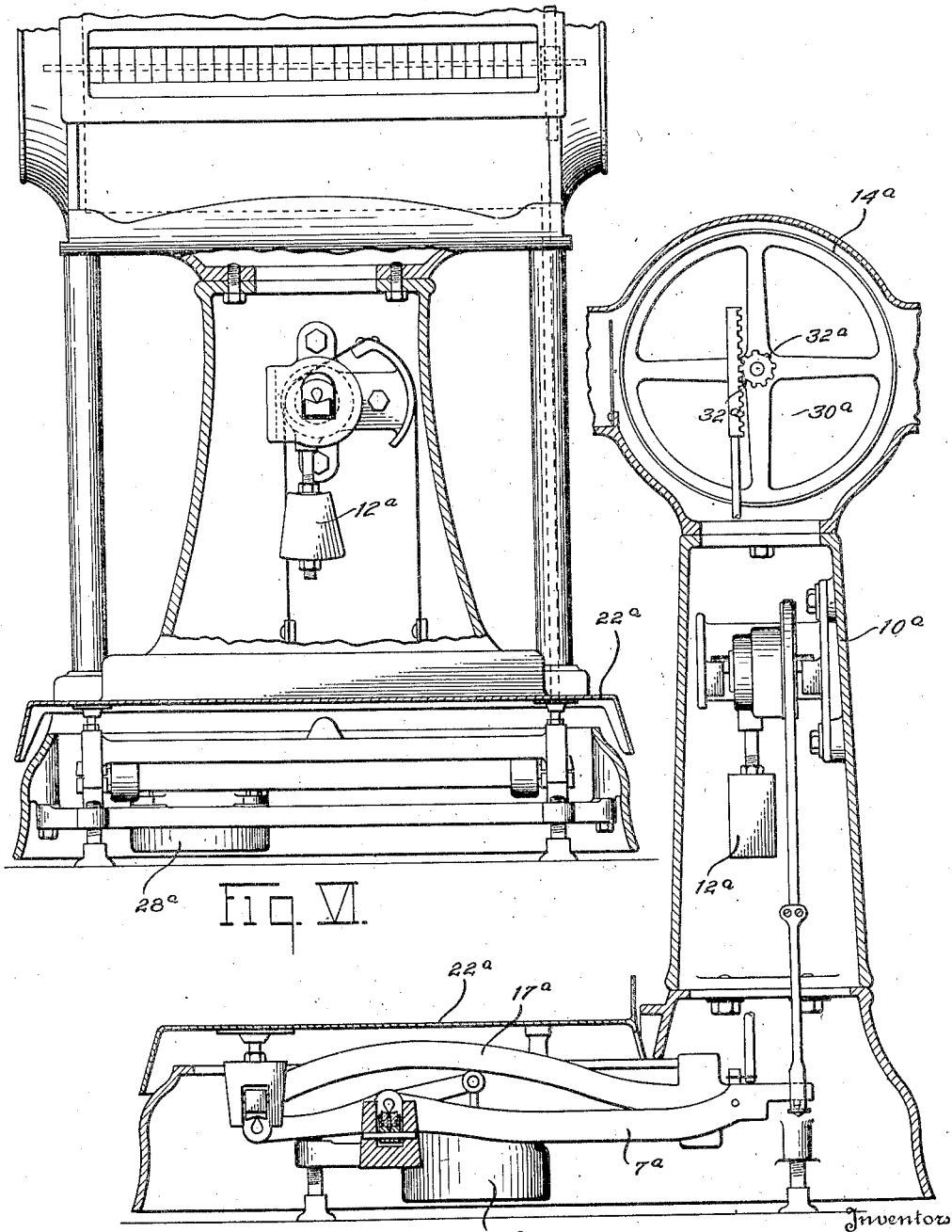

July 6, 1926.
E. G. THOMAS ET AL
1,591,578
WEIGHING SCALE
Filed May 31, 1924
5 Sheets-Sheet 4
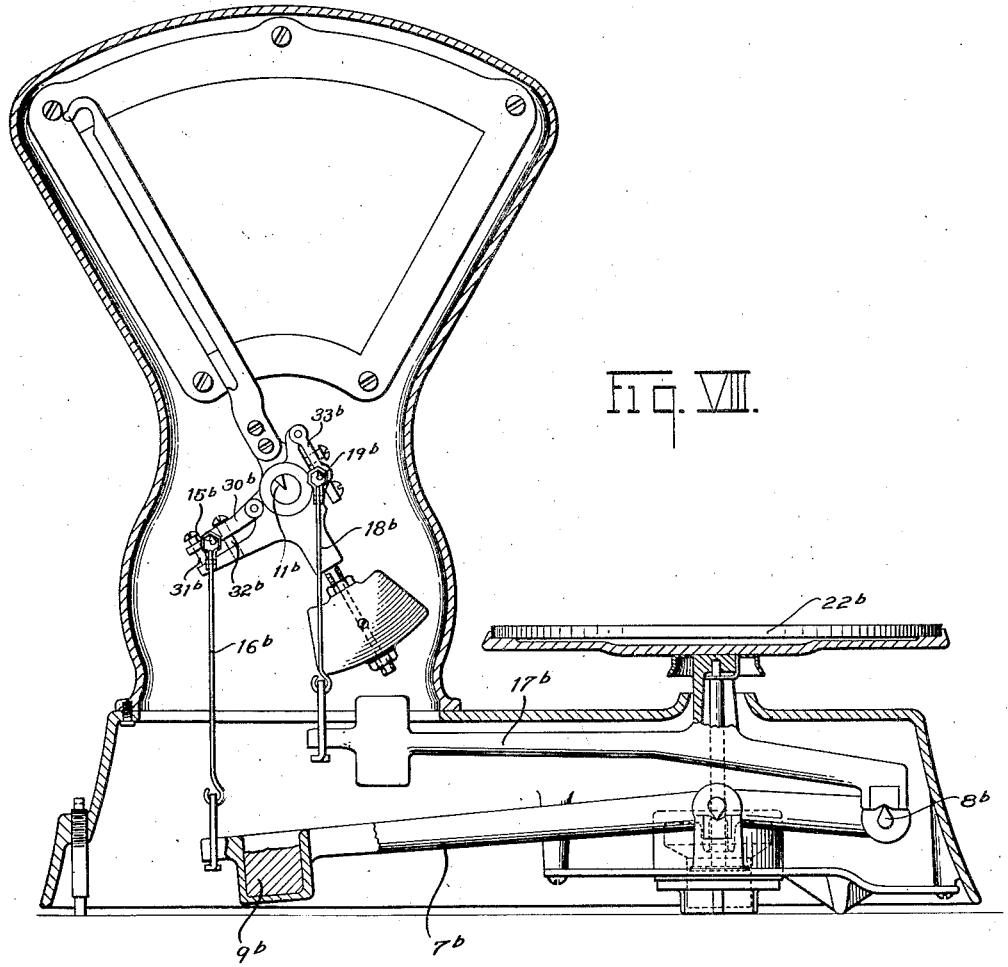
Fig. VII.
Inventors
EDWARD G. THOMAS.
CHARLES O. MARSHALL
By COMarshall
Attorney July 6, 1926.
E. G. THOMAS ET AL.
WEIGHING SCALE
Filed May 31, 1924  5 Sheets-Sheet 5
1,591,578
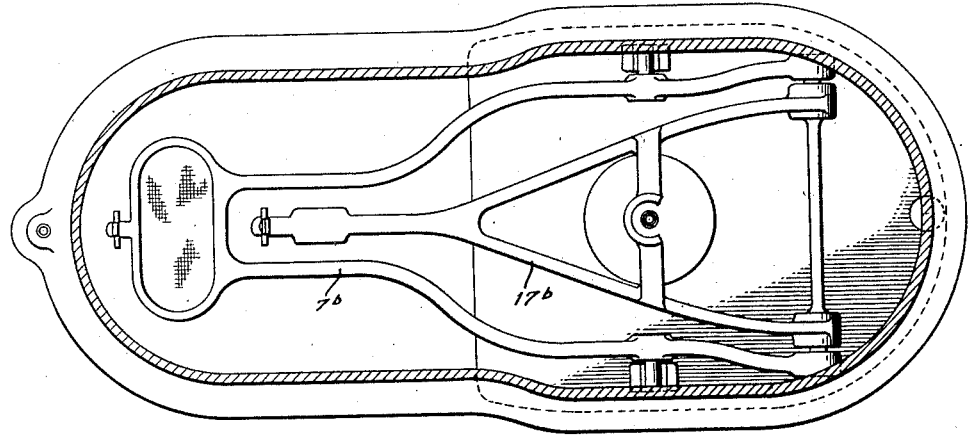
Fig. IX.
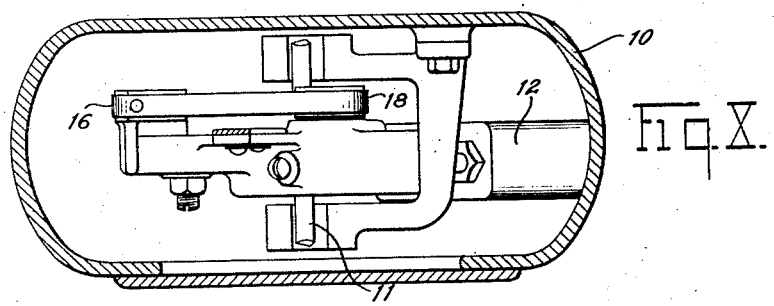
Fig. X.
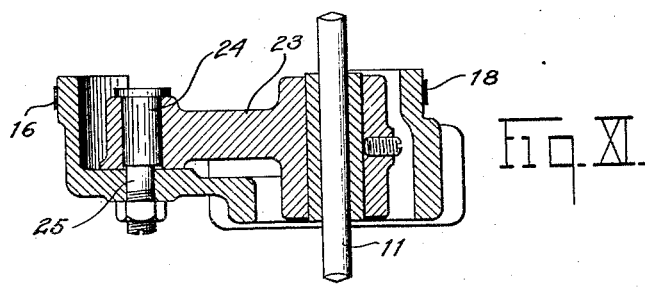
Fig. XI.
Inventors
EDWARD G. THOMAS.
CHARLES O. MARSHALL.
By C. O. Marshall
Attorney Patented July 6, 1926.                                              1,591,578

UNITED STATES PATENT OFFICE.

EDWARD G. THOMAS AND CHARLES O. MARSHALL, OF TOLEDO, OHIO, ASSIGNORS TO TOLEDO SCALE COMPANY, OF TOLEDO, OHIO, A CORPORATION OF NEW JERSEY.

WEIGHING SCALE.

Application filed May 31, 1924. Serial No. 717,003.

This invention relates to weighing scales, and one of its principal objects is the provision of weighing mechanism wherein the platform or commodity-receiver is prevented from tilting during weighing movements of the mechanism without the use of check links or other lateral thrust or pull members.

Another object of the invention is the provision of weighing mechanism having a commodity-receiver located above the members by which it is supported, said weighing mechanism having means for preventing said commodity-receiver from tilting, the weighing mechanism being so arranged that all the forces set up by the weight of the load and the weight of the parts of the weighing mechanism act substantially vertically.

Another object of the invention is the provision of means whereby the weight of the commodity is caused to act upon automatic mechanism without diminution, even though the commodity-receiver be located at one side of the automatic mechanism.

Another object of the invention is to provide pendulum weighing mechanism in which the pendulum moves through equal arcs to counterbalance equal increments of load and is provided with power sectors, the dimensions of which, as well as the relative distances from the axis of movement of the pendulum, are in simple mathematical relations.

Still another object of the invention is the provision of means for so connecting a commodity-receiver to pendulum weighing mechanism that the pendulum is caused to swing from side to side of its vertical position in counterbalancing loads within the capacity of the scale.

And still another object is the provision of simple and effective means for accurately positioning the pendulum supporting pivot.

Other objects and advantages will be apparent from the following description, in which reference is had to the accompanying drawings illustrating preferred embodiments of our invention and wherein similar reference numerals designate similar parts throughout the several views.

In the drawings:—

Figure I is a vertical sectional view through a scale embodying our invention and having an indicator of the so-called fan type;

Figure II is a vertical sectional view taken substantially on the line II—II of Figure I, the platter or commodity-receiver being shown in full lines;

Figure III is a side elevational view of a scale of the so-called cylinder type embodying our invention;

Figure IV is a front elevational view thereof;

Figure V is a plan view of the base and platform lever mechanism of the scale shown in Figures III and IV, part of the base being broken away;

Figure VI is an enlarged detail front elevational view of the scale shown in Figure IV, parts being broken away and parts being in section to more clearly disclose the invention;

Figure VII is an enlarged detail side elevational view of the scale shown in Figure VI, parts being broken away and parts in section to display the mechanism;

Figure VIII is a view similar to Figure I showing a modified form of the invention as applied to a scale having an indicator of the fan type;

Figure IX is a sectional plan view showing the arrangement of the lever mechanism in the base of the scale shown in Figure I;

Figure X is an enlarged detail sectional plan view taken substantially on the line X—X of Figure I; and Figure XI is a further enlarged detail sectional view taken substantially on the line XI—XI of Figure I.

Referring to the drawings in detail and in particular to the form of the device shown in Figures I and II, the base 1 of the scale is supported upon a frame 2 having a pair of feet 3 adjacent the right end of the base and an adjustable foot 4 adjacent its left end.

Supported upon the frame 2 by means of suitable V-groove bearings 5 and knife edge pivots 6 is a lever 7 of the first order, having a load pivot 8 at one end, its other end being overweighted, as at 9. Supported upon the base 1 adjacent its left end is an upright housing 10 within which is mounted, by means of suitable bearings and knife edge pivots 11, a load-counterbalancing pendulum 12, to which is secured an indicating hand 13 that swings over a computing chart 14. The pendulum 12 is provided with a sector 15 and is connected, by means of a flexible metallic band or ribbon 16 which overlies the sector 15, to the overweighted end of the lever 7.

Supported upon the load pivot 8 of the lever 7 is one end of a platter spider 17, the other end of which is connected, by means of a flexible metallic band or ribbon 18, to a second sector 19 on the pendulum 12. The spider 17 has a stem 20 which projects upwardly through an opening 21 in the top of the base 1 and supports a commodity-receiving platter 22.

The weight of the overweighted end 9 of the lever 7 is sufficient to keep the load pivot 8 in elevated position when the scale is empty and to cause the pendulum 12 to swing to the right a sufficient distance to keep the indicator hand 13 at zero. When, however, a load is placed upon the platter 22, a downward force is exerted upon the load pivot 8 and upon the flexible metallic ribbon 18, and the effect of the overweighted end 9 of the lever 7 is partially overcome, thus allowing the pendulum 12 to swing to the left toward vertical position, and if the combined weight of the load, the platter 22 and the spider 17 be sufficient to more than completely overcome the effect of the overweighted end 9 of the lever 7, the pendulum 12 will be swung to the left beyond vertical position to a point at which the loaded mechanism is in equilibrium.

Neither of the sectors is curved about the axis of the pivot 11 as a center, but the proportions of the lever 7 and the pendulum sectors 15 and 19 are such that the distance along a line passing through the edge of the pivot 11 at right angles to the index wire on the indicator hand 13 from the edge of the pivot 11 to the sector 15 is to the distance from the edge of the pivot 11 to the sector 19 as the distance from the fulcrum pivot of the lever 7 to the nose pivot is to the distance from the fulcrum pivot to the load pivot.

When a force is exerted upon the load pivot 8 of the lever 7 the pull upon the ribbon 16 is relieved and the pendulum 12 swings to the left under the influence of the unrelieved pull on the ribbon 18, and when an additional pull is exerted upon the ribbon 18 the pendulum swings to the left in the same way. Owing to the way the parts are proportioned, whenever the load pivot 8 moves downwardly a given distance the end of the spider 17 which is supported by the ribbon 18 is let down the same distance, and whenever the end of the spider which is supported by the ribbon 18 is forced downwardly the overweighted end of the lever 7 is lifted and the load pivot 8 is moved downwardly to the same extent as the end of the spider 17 which is supported by the ribbon 18. The platter 22 thus remains level throughout all weighing movements of the mechanism, and the effect upon the load-counterbalancing pendulum 12 is the same whether the load be placed at the extreme right side of the platter or at the extreme left side. The weight of the end 9 of the lever 7 is sufficient to more than counterbalance the load on the pivot 8 even when a commodity is placed at the extreme right side of the platter 22.

The weight of the spider 17 and the platter and other parts supported thereby is sufficient to swing the pendulum 12 from half to full capacity position when the pendulum is relieved of that part of the weight of the overweighted end of the lever 9 which is counterbalanced by a capacity load on the pivot 8, so that if a capacity load is placed at the extreme right side of the platform the weight of the spider 17 and the platter will swing the pendulum and indicator hand 13 to position indicating the weight of the load upon the chart.

If, on the other hand, the load is placed as near as possible to the left side of the platter, the pull on the ribbon 16 will be only slightly relieved, while the pull on the ribbon 18 will be increased sufficiently to cause the pendulum indicator to swing to proper indicating position.

The sectors 15 and 19 are so proportioned that equal increments of load upon the platter 22 will move the indicator hand through approximately equal arcs. We have found that if the sectors are made as arcs of true circles, the centers of which are located at distances from the edge of the pivot 11 equal to one half the radii of the respective sectors, that the arcs traversed by the pendulum in counterbalancing equal increments of load are so nearly equal that no variation can be detected by the eye. As sectors having surfaces corresponding to the arcs of circles are easily machined, we prefer to use sectors of this type, but our invention in its broad aspect is not limited to any particular type of sector.

The arms of the lever 7 may be of any convenient ratio so long as the sectors are proportioned accordingly, the ratio shown in the drawing being chosen principally to secure convenient relative locations of the load-receiver and indicator.

In order to provide a convenient means for adjusting the pivot 11 to bring it exactly into line between the high points of the sectors 15 and 19 and into proper relative distances from the sectors, we have mounted the pivot 11 on an arm 23 which swings upon an eccentric trunnion 24 on a pin 25 mounted for rotatable adjustment in the pendulum center. By turning the pin 25 the edge of the pivot 11 may be moved toward or away from either of the sectors. The arm 23 may be swung about its trunnion by means of adjusting screws 26 and 27. By loosening one of these screws and tightening the other, the edge of the pivot may be raised or lowered to bring it into proper relation to a straight line joining the high points of the sectors. The pendulum 12 may be adjusted by moving the pendulum weight upwardly or downwardly on its stem, which preferably extends at right angles to a line joining the high points of the sectors.

Vibration of the mechanism is dampened by means of a suitable dash pot 28 having a plunger 29 which is attached to the platter spider.

In the form of device illustrated in Figures III to VII, the base $1^a$ supports a lever $7^a$ which carries one end of a platter spider $17^a$. The lever $7^a$ and platter spider $17^a$ have the same function as the lever 7 and platter spider 17. They extend, however, from the front of the base to the rear end thereof, where a housing $10^a$ is supported upon the base. The housing $10^a$ contains a pendulum $12^a$ which is shown in Figures VI and VII in half capacity position and which is essentially the same as the pendulum 12 described above. The indicator in this form of the device is a rotatable cylindrical chart $14^a$ carrying indicia which are visible through openings in the front and rear of the housing $10^a$. The cylinder is rotated by means of a rack bar $30^a$ which is pivotally secured at its lower end to the lever $7^a$ and is provided at its upper end with a rack $31^a$ meshing with a pinion $32^a$ fixed to the shaft of the cylindrical chart $14^a$. The dash pot $28^a$ in this form of the device is connected to the lever $7^a$. When a load is placed upon the platform $22^a$ of the scale the forward end of the lever $7^a$ moves upwardly and the platter spider moves downwardly at both ends, as in the form of device already described, so that the pendulum $12^a$ swings from right to left and the rack bar $30^a$ moves upwardly, causing the chart $14^a$ to revolve to a position in which the proper indications are visible through the front and rear windows of the housing $10^a$.

In the form of device shown in Figures VIII and IX the construction of the lever mechanism in the base is identical with that shown in Figures I and II, the lever $7^b$ corresponding to the lever 7 and the spider $17^b$ corresponding to the spider 17. The pendulum mechanism, however, is arranged somewhat differently. Instead of sectors such as 15 and 19 and ribbons 16 and 18 such as are shown in Figure I, the pendulum in the form of device shown in Figure VIII is provided with a pivot $15^b$ and a pivot $19^b$ which are connected respectively by means of links $16^b$ and $18^b$ to the lever $7^b$ and spider $17^b$. The distance of the pivot $19^b$ from the fulcrum pivot $11^b$ of the pendulum is to the distance of the pivot $15^b$ from the fulcrum pivot $11^b$ as the distance of the load pivot $8^b$ from the fulcrum pivot of the lever $7^b$ is to the distance of the nose pivot from the fulcrum pivot of the lever. If, therefore, a load is placed upon the platter $22^b$ at a point directly above the load pivot $8^b$ and the overweighted end $9^b$ of the lever is thus partially counterbalanced, the pendulum will swing to the left and the pivot $15^b$ will rise, the nose pivot of the lever which is connected to the pivot $15^b$ by the link $16^b$ rising approximately the same distance. Since the nose pivot of the lever $7^b$ and the pivot $15^b$ rise through the same distance, the pivot $19^b$ and the load pivot $8^b$ of the lever will descend through the same distance and the platter $22^b$ will, therefore, remain level throughout all weighing movements.

If the load be placed adjacent the left side of the platter, additional force will be exerted on the link $18^b$ and the pendulum will swing to the left, lifting the nose of the lever $7^b$, while the load pivot $8^b$ of the lever descends to the same extent as the link $18^b$ moves downwardly. Since the platter $22^b$ remains horizontal in all weighing movements, a load placed upon it will have the same final effect on the weighing mechanism, regardless of the position on the platter in which it is placed.

With this type of scale the graduations in the center of the chart will be more widely spaced than those adjacent its sides.

In order to provide means for adjusting the state of alignment of the pivots $11^b$, $15^b$ and $19^b$, the pivot $15^b$ is mounted on an arm $30^b$ which may be swung upwardly or downwardly by loosening one of the screws $31^b$ or $32^b$ and tightening the other. This provides means for correcting the condition of alignment of the pivots. In order to provide means for bringing the pivots $15^b$ and $19^b$ to the proper relative distances from the fulcrum pivot $11^b$, the pivot $19^b$ is mounted on an arm $33^b$ so that it may be swung toward or away from the pivot $11^b$. If the pivot $15^b$ is too far from the pivot $11^b$ relative to the distance of the pivot $19^b$, the pivot $19^b$ may be swung away from the pivot $11^b$. If the pivot $19^b$ is too far from the pivot $11^b$ it may be swung toward the pivot $11^b$. The arm $33^b$ is moved by means of adjusting screws similar to those with which the arm $30^b$ is provided.

The embodiments of my invention herein shown and described are to be regarded as illustrative only, and it is to be understood that the invention is susceptible to variation, modification and change within the spirit and scope of the subjoined claims.

Having described our invention, we claim:—

1. In a weighing scale, in combination, a platform lever, a commodity-receiving platform supported thereby having an extended arm, load-counterbalancing mechanism, and means including a pair of links connecting said load-counterbalancing mechanism with said lever and the arm of said platform, whereby the platform is maintained level throughout weighing movements of the scale.

2. In a weighing scale, in combination, a platform lever, a commodity-receiving platform supported thereby, load-counterbalancing mechanism, and means including a plurality of flexible connections for connecting said load-counterbalancing mechanism with the lever and the platform, whereby said platform is maintained level throughout weighing movements of the scale.

3. In a weighing scale, in combination, a base, a platform lever supported thereby, a platform partially supported by said lever, a frame mounted upon said base, automatic load-counterbalancing mechanism supported in said frame in a position above said platform, and means connecting said automatic load-counterbalancing mechanism with the lever and platform, whereby said platform is maintained level throughout weighing movements of the scale.

4. In a weighing scale, in combination, a base, a platform lever supported thereby, a platform partially supported by said lever and having an extended arm, a frame mounted upon said base, automatic load-counterbalancing mechanism including a pendulum supported in said frame, and means including a pair of links connecting the platform lever and the extended arm of said platform with the load-counterbalancing mechanism, whereby the platform is maintained level throughout weighing movement of the scale.

5. In a weighing scale, in combination, a base, a platform lever fulcrumed thereon a load pivot carried by said lever, a platform partially supported on the load pivot carried by said lever, a frame mounted on said base, a load-offsetting pendulum fulcrumed in said frame, and means connecting said platform and platform lever to said pendulum, the distances between the load pivot and lever fulcrum and the point of connection of the platform with the pendulum and its fulcrum being respectively proportional to the distances between the lever fulcrum and the point of connection of the lever with the pendulum and between said point of connection and the fulcrum of the pendulum the arcs of movement of the load pivot of said lever and the point of connection of the platform with the pendulum being convex in the same direction.

6. In a weighing scale, in combination, a base, a platform lever supported thereby, a platform partially supported by said lever, an upright housing mounted upon the said base, a pendulum load-offsetting mechanism supported in the housing, a plurality of sectors comprising a part of said pendulum mechanism, and means including a plurality of flexible connections partially overlying the curved faces of said sectors and connecting the platform lever and the platform to the pendulum, whereby the said platform is maintained level throughout weighing movements of the scale.

7. In a weighing scale, in combination, a base housing, a platform lever supported thereby, a commodity-receiving platform partially supported by said lever and having an extended arm, an upright housing mounted upon the rear end of said base housing, a pendulum supported in said upright housing and having an indicator, a chart in said upright housing and adapted to co-operate with said indicator, means connecting said pendulum and said platform lever, and means connecting said pendulum and the extended arm of said platform, whereby said platform is maintained level throughout weighing movements of the scale.

8. In a weighing scale, in combination, a base, a platform lever supported thereby, a platform partially supported by said platform lever and having an extended arm, a frame mounted upon the rear end of said base, a pendulum supported by said frame, an indicator supported by said frame and adapted to co-operate with the weighing mechanism, means connecting said pendulum and said platform lever, and means connecting said pendulum and the extended arm of the platform, whereby said platform is maintained level throughout weighing movements of the scale.

9. In a weighing scale, in combination, a base housing, a platform lever supported therein, a platform partially supported by said lever and having an extended arm, an upright housing mounted upon the rear end of said base housing, a pendulum having a plurality of sectors supported within said base housing, a cylindrical indicator supported within said upright housing connected with the weighing mechanism and adapted to co-operate therewith, and means including a pair of flexible members partially overlying said pendulum sectors for connecting the pendulum with the platform lever and the extended arm of the platform, whereby said platform is maintained level throughout weighing movements of the scale.

EDWARD G. THOMAS.
CHARLES O. MARSHALL.